United States Patent
Sheoran et al.

(10) Patent No.: US 7,152,410 B2
(45) Date of Patent: Dec. 26, 2006

(54) SYSTEM AND METHOD FOR DUMPING SURGE FLOW INTO EDUCTOR PRIMARY NOZZLE FOR FREE TURBINE

(75) Inventors: Yogendra Y. Sheoran, Scottsdale, AZ (US); Roger I. Payne, Chandler, AZ (US)

(73) Assignee: Honeywell International, Inc., Morristown, NJ (US)

(*) Notice: Subject to any disclaimer, the term of this patent is extended or adjusted under 35 U.S.C. 154(b) by 138 days.

(21) Appl. No.: 10/866,398

(22) Filed: Jun. 10, 2004

(65) Prior Publication Data
US 2005/0274117 A1 Dec. 15, 2005

(51) Int. Cl.
*F02C 6/08* (2006.01)
(52) U.S. Cl. ........................ 60/782; 60/770; 239/265.11
(58) Field of Classification Search .................. 60/770, 60/772, 782; 239/265.11
See application file for complete search history.

(56) References Cited

U.S. PATENT DOCUMENTS

| | | | |
|---|---|---|---|
| 2,949,734 A * | 8/1960 | Bertin et al. ................. 285/410 |
| 4,044,555 A * | 8/1977 | McLoughlin et al. ......... 60/264 |
| 4,135,363 A * | 1/1979 | Packman ..................... 60/262 |
| 4,290,262 A * | 9/1981 | Wynosky et al. ............. 60/262 |
| 4,501,393 A * | 2/1985 | Klees et al. ........... 239/265.13 |
| 4,909,346 A * | 3/1990 | Torkelson ................... 181/213 |
| 5,265,408 A | 11/1993 | Sheoran et al. |
| 5,284,012 A | 2/1994 | Laborie et al. |
| 5,438,823 A * | 8/1995 | Loxley et al. ............. 60/39.08 |
| 5,555,722 A | 9/1996 | Mehr-Ayin et al. |
| 5,655,359 A | 8/1997 | Campbell et al. |
| 5,908,159 A * | 6/1999 | Rudolph ................. 239/265.17 |
| 6,092,360 A | 7/2000 | Hoag et al. |
| 6,615,576 B1 | 9/2003 | Sheoran et al. |
| 6,651,929 B1 | 11/2003 | Dionne |
| 2002/0139120 A1 * | 10/2002 | Sheoran et al. ............... 60/772 |

* cited by examiner

*Primary Examiner*—William H. Rodriguez
(74) *Attorney, Agent, or Firm*—Ingrassia Fisher & Lorenz

(57) ABSTRACT

A method and apparatus for dumping surge bleed air into a primary nozzle of a free gas turbine engine. The surge bleed air is introduced into gas turbine exhaust flow within the primary nozzle to create a mixed flow which may be used as a combined driver flow to compensate for reduced engine exhaust flow during periods when operation of the turbine engine may be exclusively dedicated to only electric load operation. The surge bleed air may not be the educted flow or the secondary driven flow, while cooling air passing through an oil cooler may be an educted flow. Surge bleed air may flow through, for example, mixer lobes, hollow struts, or the center body before mixing with the gas turbine exhaust flow.

32 Claims, 11 Drawing Sheets

SYSTEM AND METHOD FOR DUMPING SURGE FLOW INTO EDUCTOR PRIMARY NOZZLE FOR FREE TURBINE

BACKGROUND OF THE INVENTION

This invention relates generally to a method and apparatus for cooling the heat generated by a gas turbine engine mounted in a compartment and, in particular, to an eductor system that directs gas turbine exhaust gas and surge bleed air into a primary nozzle of the eductor to entrain sufficient cooling airflow to cool the compartment and to cool the gearbox and generator oil.

In addition to their traditional propulsion functions, gas turbine engines are used as auxiliary power units (APUs) aboard many types of aircraft, ground vehicles, and stationary installations to provide continuous shaft and/or pneumatic power. The shaft power is used to drive electric generators, load compressors, hydraulic pumps, or other equipment. The pneumatic power is used by air turbine motors for main engine starting, cabin air-conditioning and pressurization, de-icing, or other components requiring compressed air. When used aboard an aircraft, for example, the APU is typically mounted in a compartment located within the tail cone of the aircraft.

Historically, APUs have only been operated when the aircraft was on the ground. Currently, aircraft need an additional source of power while in flight. To meet this need an APU may be started and operated in flight at high altitudes. During the operation of the APU, heat is rejected into the compartment from numerous sources including the engine skin; exhaust gases, the tailpipe, as well as the engine oil cooler, generator, and other compartment accessories. To prevent the temperature in the compartment from reaching unacceptable levels, a ventilating or cooling airflow must be provided through the compartment.

To remove this heat, an axial, vane type fan driven by the APU gearbox is usually provided to pump cooling air past the oil cooler as well as through the compartment. However, because of their multiplicity of high speed, rotating parts, these fans are susceptible to mechanical failures, which may require that the aircraft be removed from operation. These fans sometimes leak oil into the cooling flow, which may then cover the oil cooler fins resulting in reduced heat transfer and the possibility of an APU automatic shutdown because of excessive oil temperature.

An alternative to fans is a simple exhaust eductor system having a primary nozzle and an exhaust mixing tailpipe. This eductor uses the kinetic energy of the APU exhaust gas to entrain ambient cooling flow through the compartment and over an oil cooler The APU's shaft power can be delivered to the gearbox and load compressor in one of two engine architectures. In a single shaft direct drive arrangement, the core engine, the load compressor, and the gearbox are all connected to the same shaft and rotate at the same speed. In another arrangement, the core engine compressor and turbine are connected via one shaft while the gearbox and the load compressor are driven by a free turbine via another shaft.

Each of these engine architectures has their advantages and disadvantages. The eductor performance in a free turbine APU can be reduced during no pneumatic condition. The eductor's cooling flow pumping capacity is directly related to the primary flow rate.

In ground servicing of commercial aircraft, where ground crew fuel and provision the aircraft, and the like, certain noise level limits must be maintained to ensure the health and safety of the ground crew. Therefore, the propulsion engines of the aircraft are typically shut down and only an APU remains in use. The APU may be used in ground service to maintain aircraft interior cooling, oil cooling, engine cooling, to generate electricity for interior lighting, and other necessary operations.

FIG. 1 shows a cross-sectional view of a prior art free turbine auxiliary power unit. A core engine turbine 160 may be coaxial with a free turbine 150. The core engine turbine 160 may include a core engine combustor 140 and a core engine shaft 142 that may drive a core engine compressor 162. Inside the core engine turbine may be located a turbine shaft 144 for delivering shaft power from the free turbine 150 to the load compressor 110 and the gearbox 120 driving generator 130. Turbine exhaust may exit through the primary nozzle 30 and the mixing duct 90. The primary nozzle 30 and the mixing duct 90 together function as the eductor. The turbine exhaust exiting the primary nozzle 30 into the mixing duct 90 entrains ambient air through the oil cooler 164. When needed, the free turbine may be burdened by a generator 130, a gearbox 120, and/or a load compressor 110.

In a free turbine engine, the exhaust flow can vary depending on the load demand on the engine. In a free turbine engine at low pneumatic load, but high generator load, the exhaust flow could be considerably lower than when the free turbine engine is at high pneumatic load and high generator load, which would reduce cooling flow pumping while cooling flow demand for the generator and gearbox oil cooling would still be high.

In certain APU operating conditions when the operator shuts off the demand for the pneumatic load (for example after the main engine start completion, the demand for the high pressure air to drive the starter turbine is shut off) the high pressure airflow must be dumped overboard to prevent the load compressor from surging. This air is often dumped in the exhaust tailpipe.

FIG. 2 shows the prior art approach to mixing exhaust flow with surge bleed air and cooling airflow. Exhaust flow 170 from an upstream gas turbine engine (not shown) flows, as a primary driving flow, past turbine 50 and around center body 40 toward mixing plane 100. Cooling air 174 flows from the external environment through oil cooler 60, into cooling flow plenum 80, and downstream through mixing plane 100, entrained by eduction action of the exhaust flow 170. Continuing downstream from the mixing plane 100, surge bleed air 20 flows into mixing duct 90, wherein the surge bleed air 20 may be entrained into the mixture of cooling airflow 174 and exhaust flow 170. During periods of reduced pneumatic load, such as after a main engine start completion when the operator shuts off the demand for the pneumatic load, the primary driving flow from the gas turbine engine (not shown) may be diminished, while the generator load and need for gear box oil cooling may remain high. In this situation, the primary flow may not be sufficient to entrain sufficient cooling airflow 174 within the mixing duct 90 and provide adequate oil cooling. Dumping the surge bleed air 20 downstream of the primary nozzle 30 into the mixing duct 90 can further aggravate the low eductor pumping.

As can be seen, there is a need for an improved apparatus and method for dumping surge bleed air into the primary flow to compensate for diminished pneumatic load and increased need for component cooling while maintaining a correspondingly high cooling flow rate and eductor performance.

SUMMARY OF THE INVENTION

In one aspect of the present invention, a cooling apparatus for a gas turbine engine comprises a primary nozzle; a cooling flow plenum in fluid communication with the external environment and the cooling flow plenum configured to be larger in radius than the primary nozzle; and a surge air dump nozzle disposed adjacent to the cooling flow plenum, wherein the primary nozzle, the cooling flow plenum, and the surge air dump nozzle are configured so as to direct the surge bleed air into the primary nozzle.

In a further aspect of the present invention, an auxiliary power unit comprises an oil cooler; a primary nozzle; a cooling flow plenum in air communication with the oil cooler and downstream of the oil cooler; and a surge air dump nozzle disposed adjacent to the primary nozzle, the surge air dump nozzle comprising mixing lobes, wherein the primary nozzle, the cooling flow plenum, and the surge air dump nozzle are configured so as to direct an exhaust flow and the surge bleed air into the primary nozzle and mix the surge bleed air with the exhaust flow, within the primary nozzle, and entrain the cooling air with the mixed surge bleed air and the exhaust flow.

In another aspect of the present invention, a cooling apparatus for an auxiliary power unit comprises an oil cooler; a primary nozzle; a cooling flow plenum in air communication with the oil cooler and downstream of the oil cooler; and an annular surge air dump nozzle disposed about a center body, wherein the primary nozzle is disposed about the center body; and wherein the primary nozzle, the cooling flow plenum, and the surge air dump nozzle are formed so as to direct an exhaust flow and the surge bleed air into the primary nozzle and mix the surge bleed air with the exhaust flow, within the primary nozzle, and entrain the cooling air with the mixed surge bleed air and exhaust flow.

In yet another aspect of the present invention, a cooling apparatus comprises an auxiliary power unit; an oil cooler; a primary nozzle; a cooling flow plenum in air communication with the oil cooler and downstream of the oil cooler; and a surge air plenum disposed about the primary nozzle; wherein the surge air plenum is in fluid communication with a hollow strut such that surge bleed air is directed to flow through the hollow strut and the surge bleed air mixes with an exhaust flow.

In yet a further aspect of the present invention, an aircraft comprises a compartment; an auxiliary power unit housed within the compartment; the auxiliary power unit comprising a turbine; an oil cooler within the compartment; a primary nozzle downstream of the turbine; a cooling flow plenum in air communication with the oil cooler and the cooling flow plenum disposed downstream of the oil cooler; a surge air plenum in air communication with a surge air duct; a surge air dump nozzle disposed about the primary nozzle and downstream of the surge air plenum; and a mixing duct, wherein the primary nozzle, the cooling flow plenum, and the surge air plenum are formed so as to direct an exhaust flow from the auxiliary power unit and the surge bleed air into the primary nozzle and mix the surge bleed air with the exhaust flow, within the primary nozzle, and entrain the cooling air with the mixed surge bleed air and exhaust flow.

In still a further aspect of the present invention, a method for cooling a gas turbine engine comprises directing a cooling airflow into a cooling flow plenum; directing a surge bleed air into a surge air plenum; drawing the surge bleed air into a primary nozzle of the gas turbine engine; mixing the surge bleed air with an exhaust flow from the gas turbine engine, wherein the mixing is performed within the primary nozzle; creating a mixed exhaust flow comprising the surge bleed air and the exhaust flow; entraining the cooling airflow through the cooling flow plenum and into the mixed exhaust flow; drawing the cooling airflow across an oil cooler; and directing the mixed exhaust flow and the cooling airflow into an eductor mixing duct.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a low back pressure turbine eductor cooling system and a method of cooling a gas turbine engine. This system can include an eductor subsystem for entraining airflow through a compartment to provide all necessary cooling of a gas turbine engine, for example, by cooling the oil of the engine. This system may also provide an apparatus for dumping surge bleed air into the primary nozzle of a gas turbine engine. Additionally, the present invention may provide a method for compensating for reduced primary exhaust airflow to maximize eduction pumping. Because it provides these functions at minimal weight and within stringent space limitations, the gas turbine eductor cooling system of the present invention is suitable for use on aircraft, and particularly on an auxiliary power unit (APU), which may be mounted, for example, in the tail structure or tail cone of a commercial aircraft. Although the following description will describe the present invention as being used in aircraft, the following description should be understood to be applicable to other suitable uses, such as ground vehicles and stationary installations to provide continuous shaft and/or pneumatic power. The present invention may be used in systems that drive electric generators, hydraulic pumps, propulsion gas turbines, or other equipment.

Because the present invention dumps surge bleed air into the primary nozzle, it differs from, and has advantages over, prior art turbine eduction cooling systems, which dump surge bleed air outside of the primary nozzle (for example, downstream of the primary nozzle). Dumping surge bleed air outside of the primary nozzle may cause eductor pumping to be low when the turbine flow rate in the primary nozzle is lowered, resulting in lowered cooling efficiency. Thus, in contrast to the prior art, the present invention, for example, compensates for lowered turbine flow rate in the primary nozzle during some engine operating conditions such as when generator load is being demanded but low or no pneumatic load is demanded; restores eductor pumping by maintaining primary flow, improves cooling efficiency; and ensures a high cooling flow eduction rate.

Figure 1:
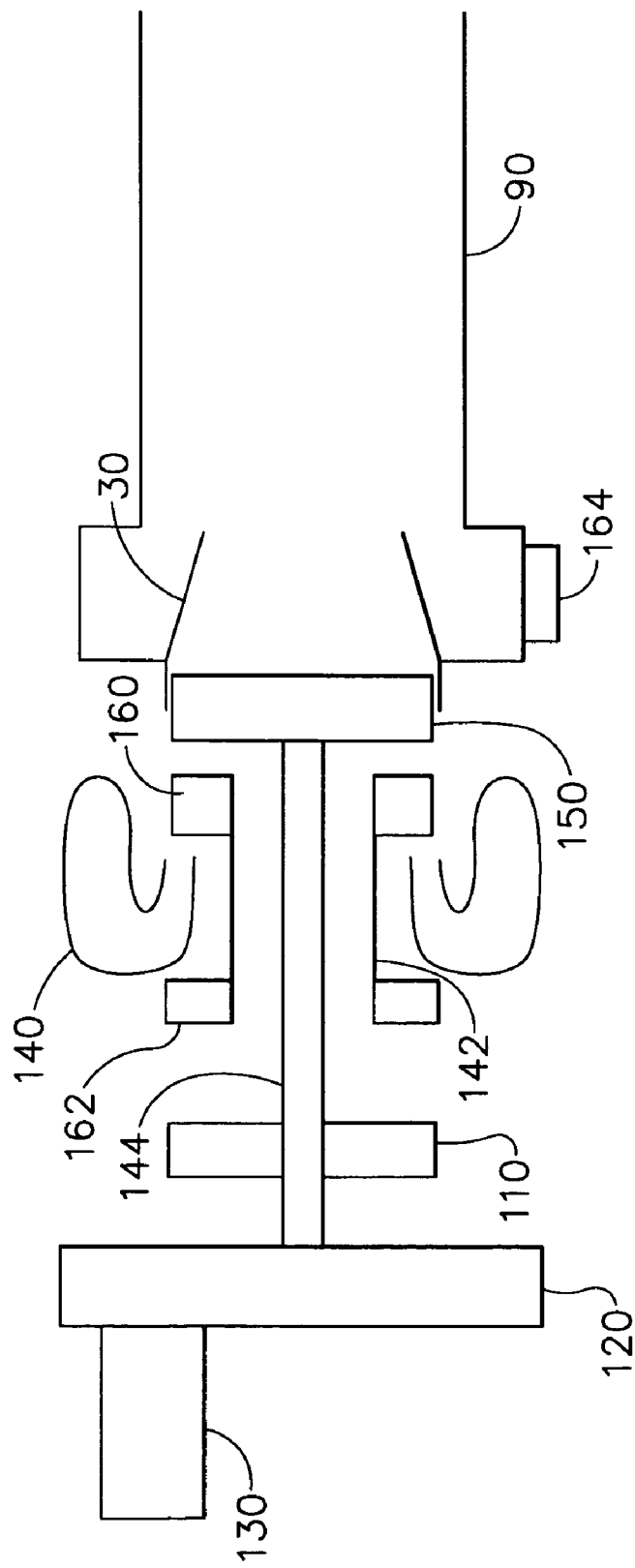
FIG. 1 is a schematic representation of a free shaft auxiliary power unit of the prior art.
Figure 2:
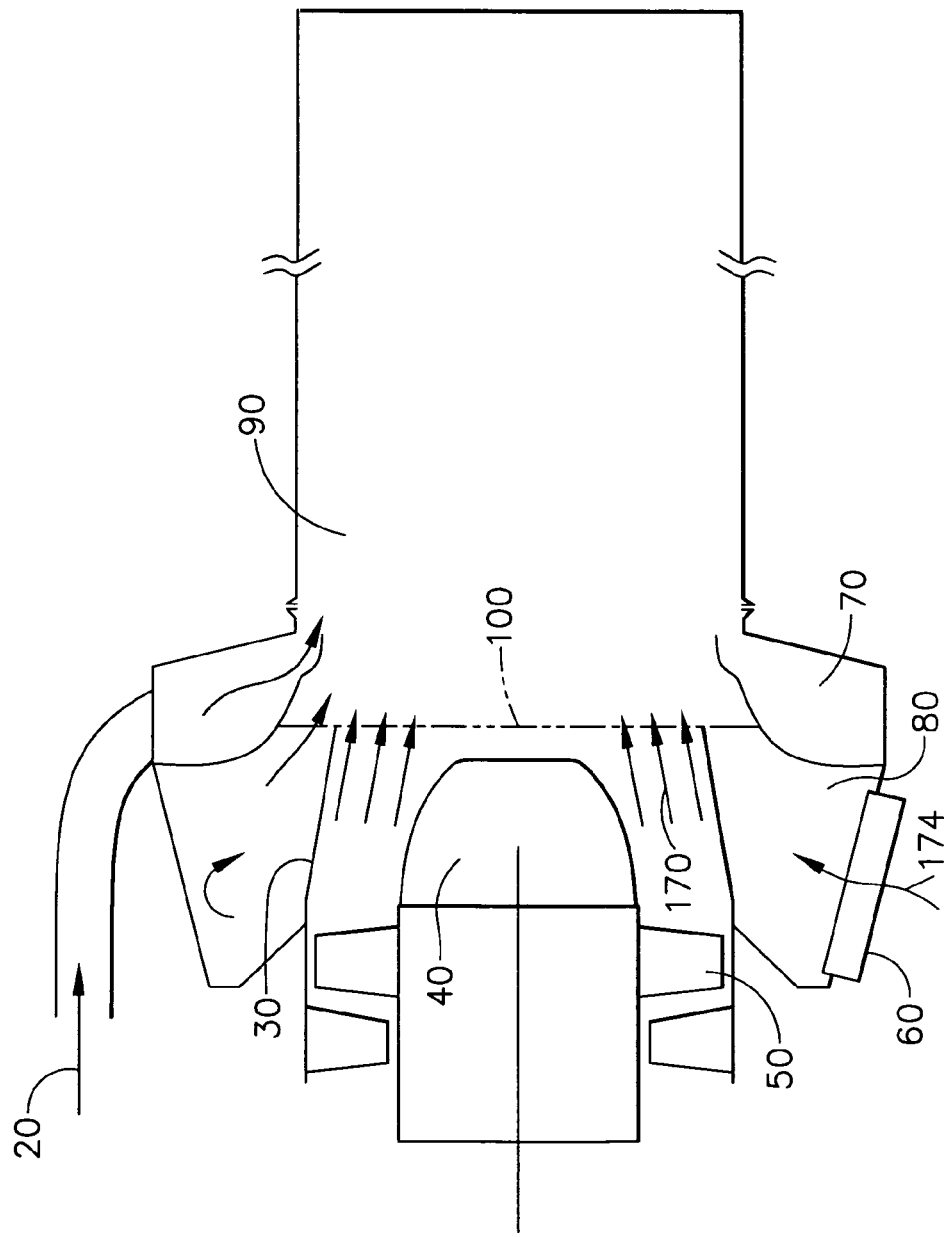
FIG. 2 is a cross-sectional view of a prior art auxiliary power unit wherein surge bleed air is introduced downstream from the primary nozzle.
Figure 3A:
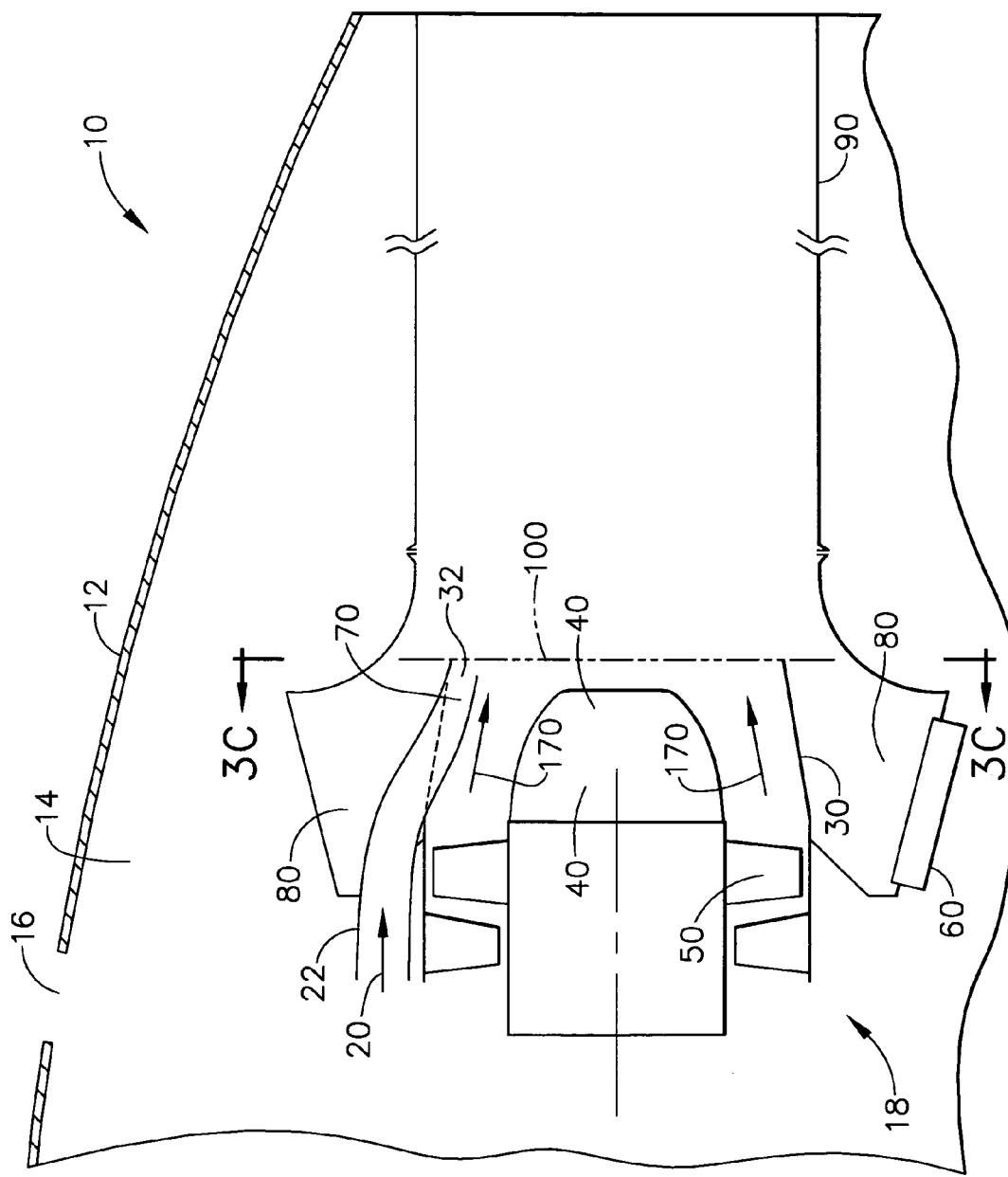
FIG. 3A is a cross-sectional view of an auxiliary power unit in an aircraft compartment, according to an embodiment of the present invention.

In more specifically describing the present invention, and as can be appreciated from FIG. 3A, the present invention provides an APU 18 which may be located inside a tail cone 10 of an aircraft. A compartment 14 may be confined within an aircraft skin 12 of the aircraft. Turbine exhaust flow 170 may flow through the APU 18, past a turbine 50, around center body 40, and through a primary nozzle 30. External ambient air may enter the compartment 14 through a compartment inlet 16, through an oil cooler 60, and into a cooling flow plenum 80. The oil cooler 60 may be an air-to-oil heat exchanger. Surge bleed air 20, which may be engine bleed air or another surplus compressed air produced by an upstream compressor (not shown), may flow through surge duct 22, which may lead towards a surge air plenum 70, and that may end in a surge air dump nozzle 32.

Figure 3B:
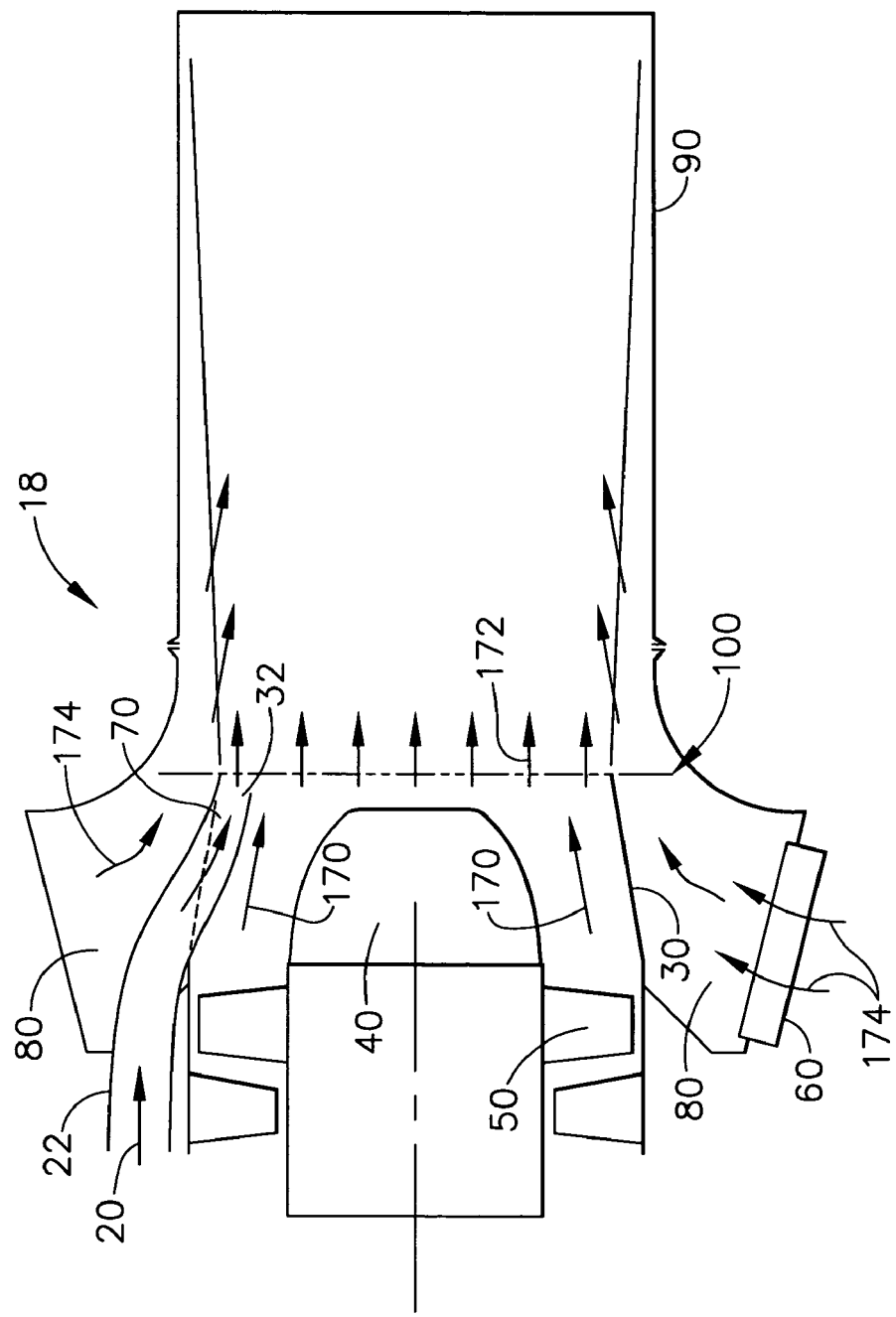
FIG. 3B is a cross-sectional view of the auxiliary power unit of FIG. 3A, illustrating the mixing effect involving the surge bleed air, the primary flow, and the cooling airflow, according to an embodiment of the present invention.

With reference to FIG. 3B, the relationships between the various gas and airflows within the APU 18 may be understood. While the turbine exhaust flow 170 flows through the primary nozzle 30 and toward a mixing plane 100, the surge bleed air 20 may traverse the surge duct 22 through the surge air plenum 70 and exit the surge air dump nozzle 32 upstream from the mixing plane 100. At or about the location of the mixing plane 100, the surge bleed air 20 may mix with the turbine exhaust flow 170 to produce the mixed exhaust flow 172. At about the location of the mixing plane 100, or downstream thereof, the lowered pressure of the adjacent mixed exhaust flow 172 may promote the flow of the cooling air 174 from the cooling flow plenum 80 and into the mixing duct 90, wherein the cooling air 174 may be entrained within the mixed exhaust flow 172. The primary nozzle 30 may be in fluid communication with the mixing duct 90. The cooling flow plenum 80 may circumscribe the primary nozzle 30.

Figure 3C:
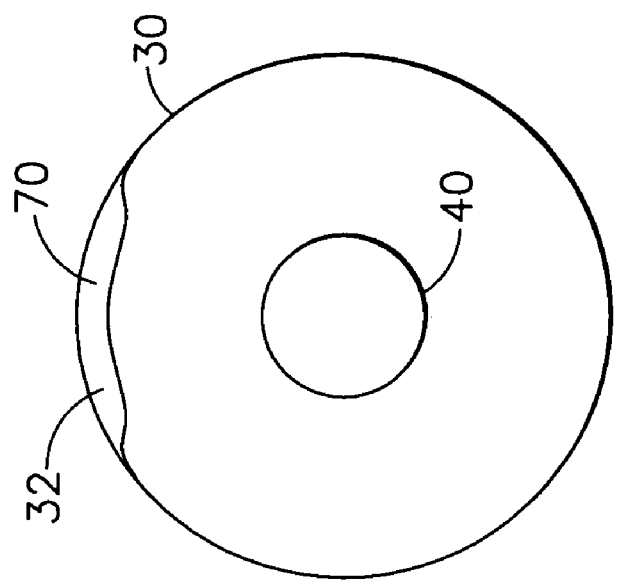
FIG. 3C is an end view of the auxiliary power unit primary nozzle of FIG. 3A, as viewed along the line 3C—3C.

In FIG. 3C, an end view, along line 3C—3C of FIG. 3A, is shown. The surge air plenum 70 and the surge air dump nozzle 32 may be configured such that the surge bleed air 20 may enter the primary nozzle 30 through at least a portion of the circumference of the cross-sectional area of the primary nozzle 30. The surge air dump nozzle 32 and/or the surge air plenum 70 may not necessarily circumscribe the primary nozzle 30. Instead, the surge air dump nozzle 32 and/or the surge air plenum 70 may only traverse a portion of the circumference of the primary nozzle 30, as shown in FIG. 3C.

Figure 4:
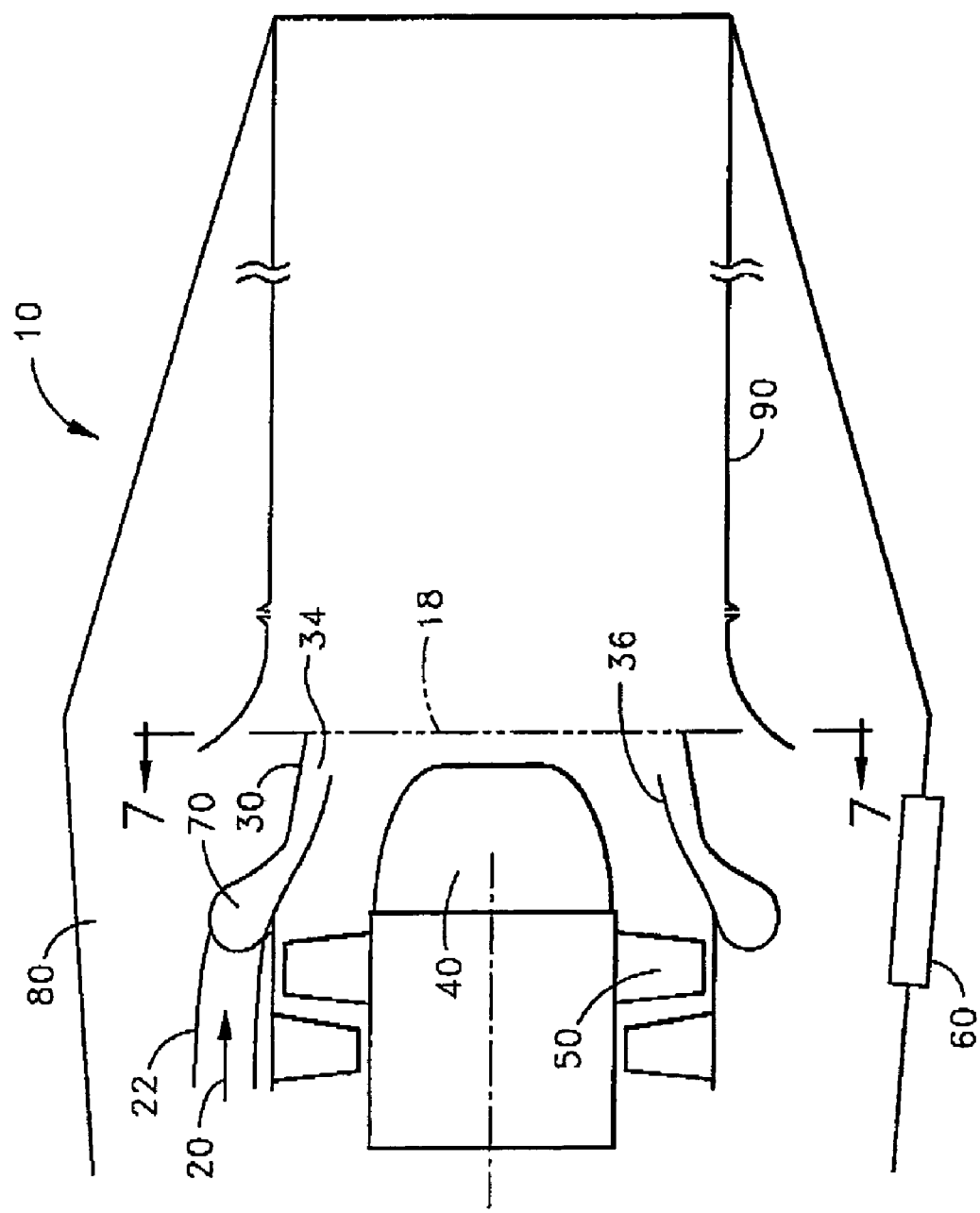
FIG. 4 is a cross-sectional view of an auxiliary power unit, according to another embodiment of the present invention.

Another embodiment of the present invention is shown in FIG. 4. APU 18 may contain a surge air dump nozzle 32 with mixing lobes 42, which may promote mixing of surge bleed air 20 with turbine exhaust flow 170. The APU 18 may function similarly to the APU 18 as shown in FIGS. 3A–C and as described above.

Figure 5:
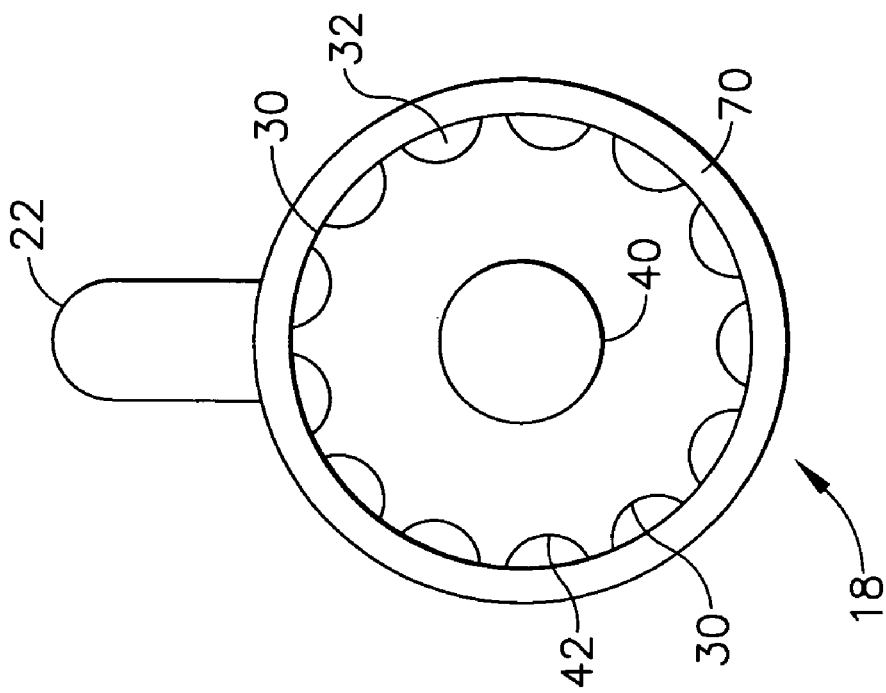
FIG. 5 is an end view of the auxiliary power unit primary nozzle of FIG. 4, as viewed along the line 5—5.

As shown in FIG. 5, the surge air dump nozzle 32 may circumscribe the primary nozzle 30, and is formed between the primary nozzle 30 and mixing lobe 42 and is connected to surge air plenum 70.

Figure 6:
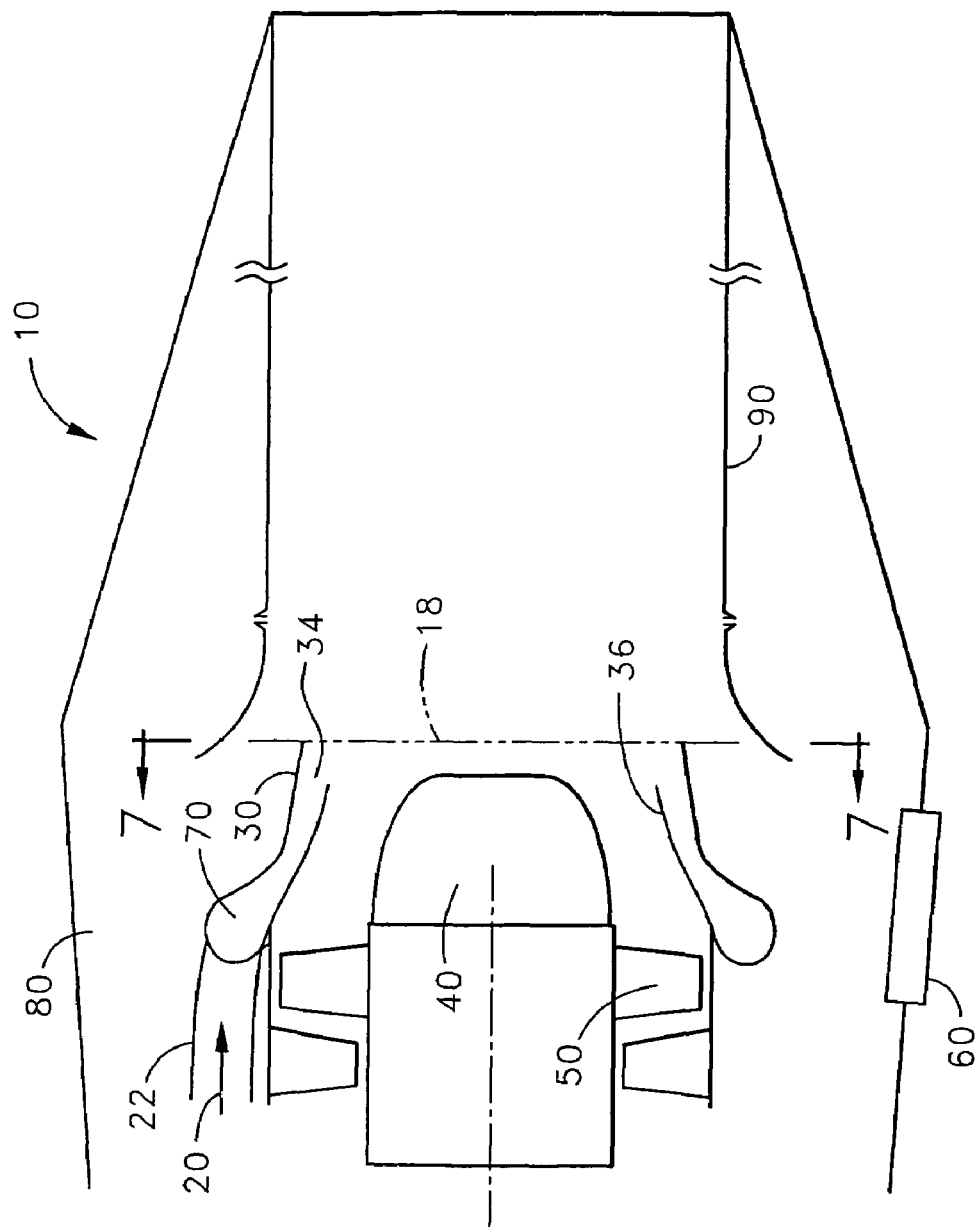
FIG. 6 is a cross-sectional view of an auxiliary power unit, according to yet another embodiment of the present invention.
Figure 7:
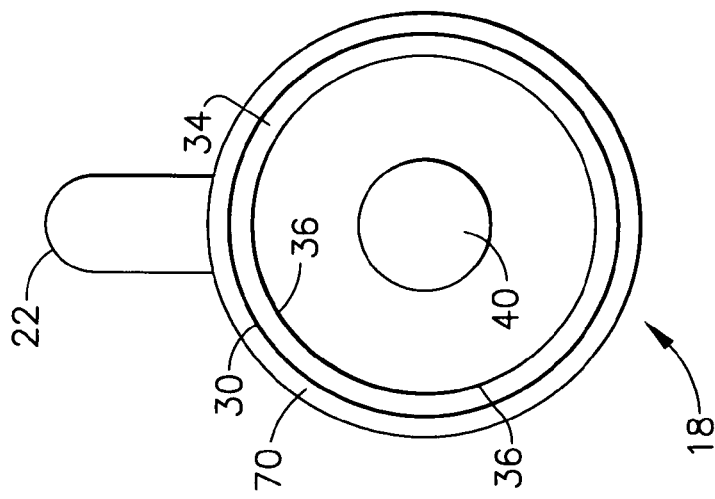
FIG. 7 is an end view of the auxiliary power unit primary nozzle of FIG. 6, as viewed along line 7—7.

In FIG. 6, a further embodiment of the present invention is shown, using an annular surge dump nozzle 34, which may circumscribe the primary nozzle 30, as further shown in FIG. 7. The surge dump nozzle annulus 34 is formed between the primary nozzle 30 and surge air nozzle wall 36, as shown in FIGS. 6 and 7. The surge air dump nozzle 34 is in fluid communication with the surge air plenum 70.

Figure 8:
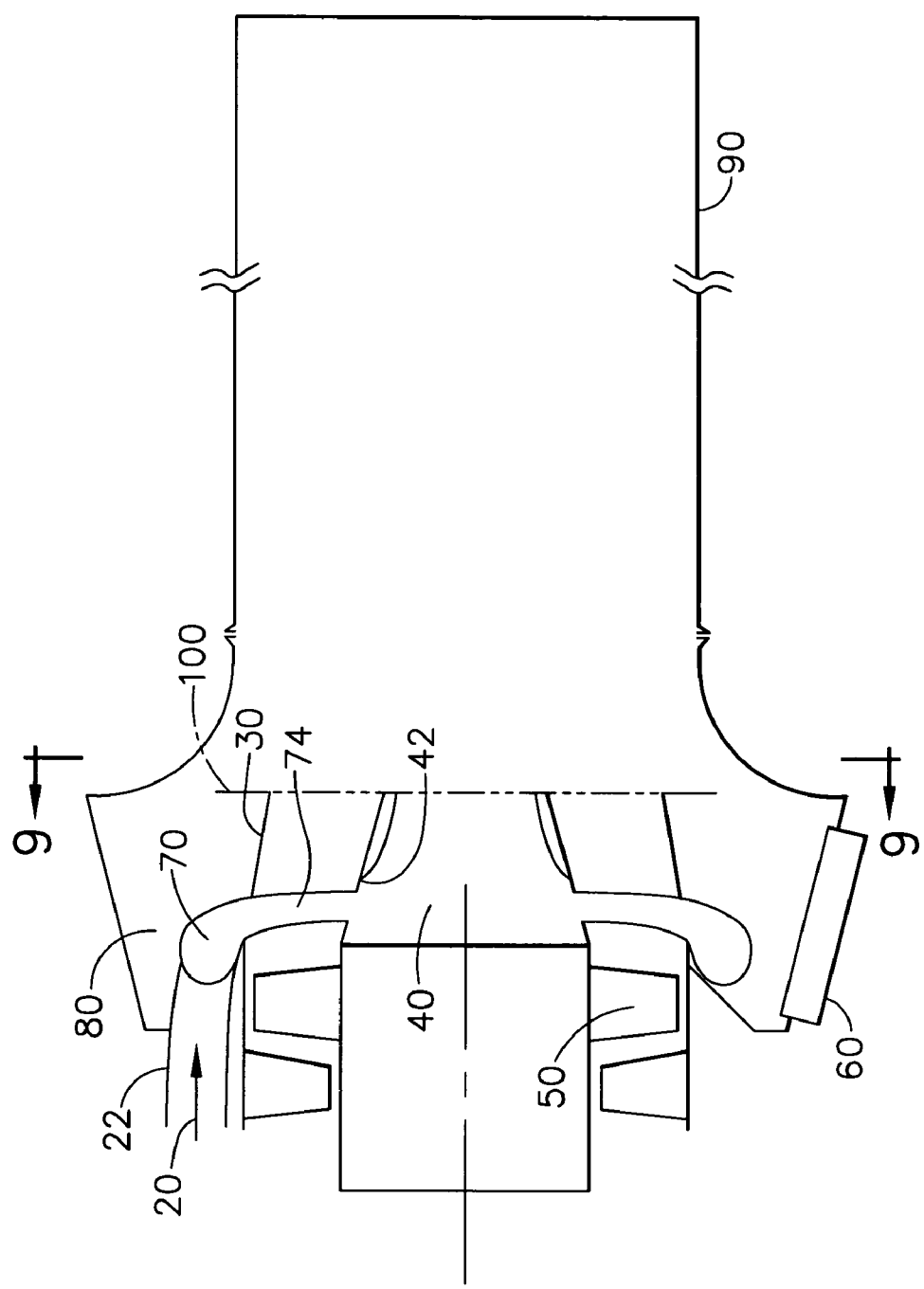
FIG. 8 is a cross-sectional view of an auxiliary power unit, according to still another embodiment of the present invention.

A still further embodiment of the present invention is shown in FIG. 8. In the embodiment as shown, center body 40 may be open, such that surge bleed air 20 may flow from the surge duct 22 and enter the mixing duct 42 after traversing the center body 40. This arrangement may serve to use the formerly unused space occupied previously by the solid center body 40 (for example, as shown in FIG. 4).

Figure 9:
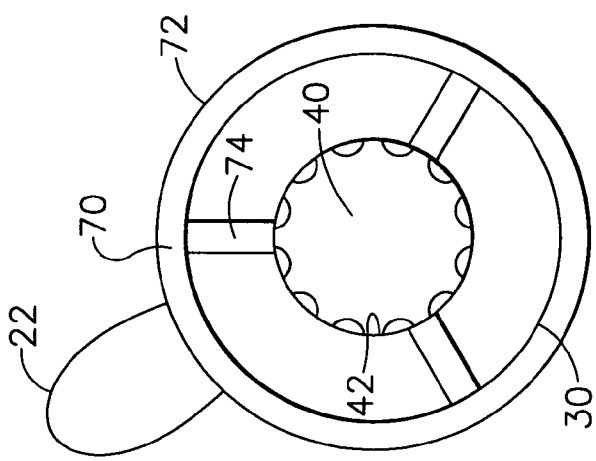
FIG. 9 is an end view of the primary nozzle of FIG. 8, as viewed along line 9—9.

As shown in the end view in FIG. 9, together with FIG. 8, the surge air duct 22 may be in fluid communication with the surge air plenum 70, a surge flow scroll 72, a hollow strut 74, and the center body 40. The center body 40 may include mixing lobes 42.

Figure 10:
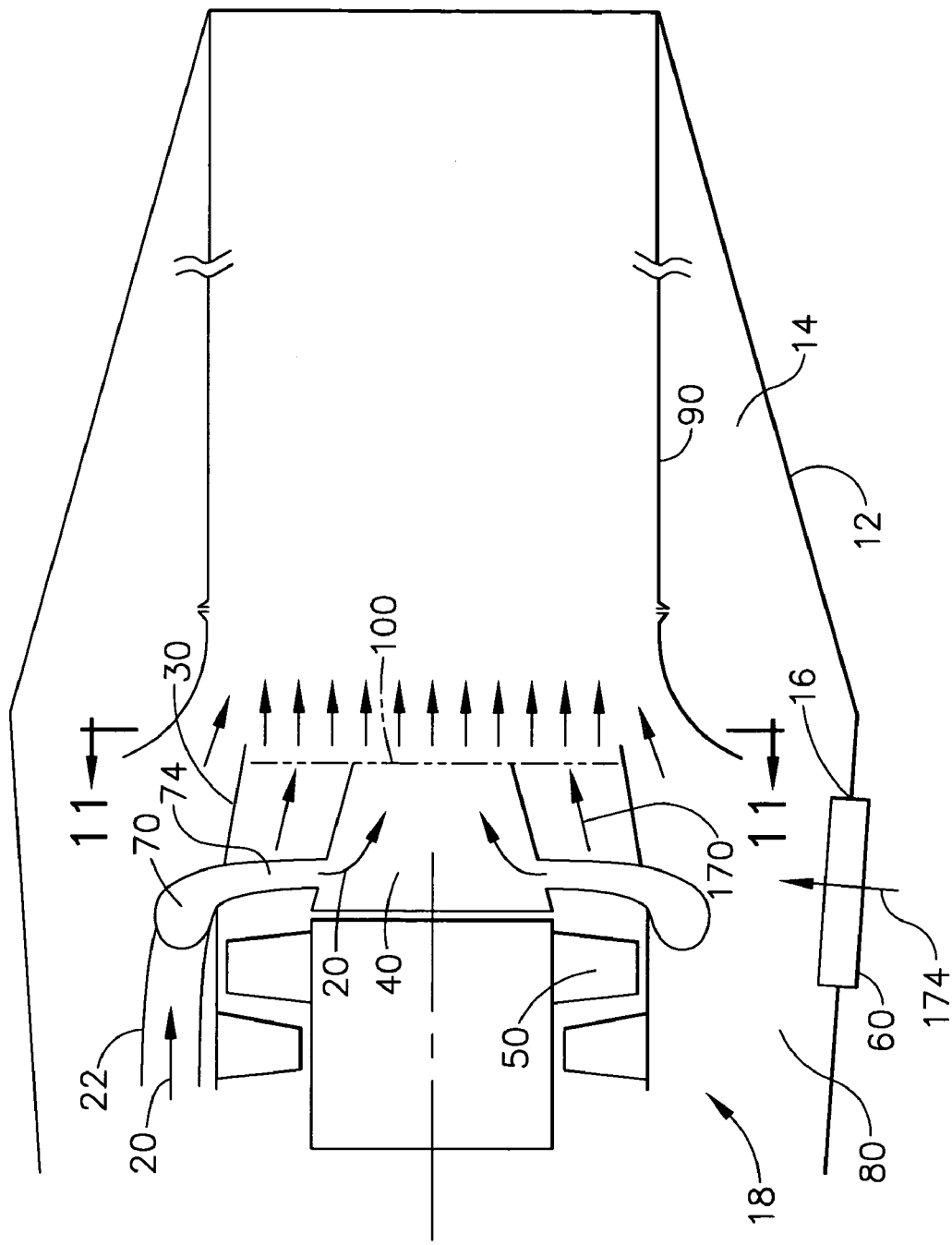
FIG. 10 is a cross-sectional view of an auxiliary power unit, according to a further embodiment of the present invention.

Yet another embodiment of the present invention is shown in FIG. 10. The APU 18 shown in FIG. 10 may be similar to the APU 18 described hereinabove with reference to FIG. 8, except that mixing lobes 42 may be omitted from the center body 40. As can be seen in FIG. 10, the surge bleed air 20 may mix with the turbine exhaust flow 170 upstream from the location of where the cooling airflow 174 is entrained into the mixed exhaust flow. FIG. 10 also shows an arrangement of the eductor system by removing eductor cooling air plenum 80 where the aircraft skin 12 forms the cooling flow plenum 14. In this arrangement the cool ambient air is first drawn through the oil cooler 60 placed in the aircraft compartment inlet 16 and then this air may pass through the APU compartment 14 for compartment cooling. All surge dump and primary nozzle 30 arrangements may work with either eductor configuration.

Figure 11:
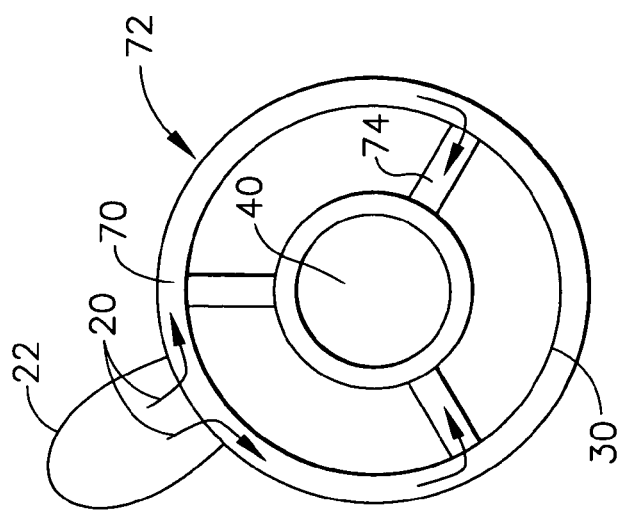
FIG. 11 is an end view of the primary nozzle of FIG. 10, as viewed along line 11—11.

FIG. 11 is an end view of the primary nozzle 30 and surge duct 22 and surge flow scroll 72 of FIG. 10, including the flow paths of the surge bleed air 20 through the surge flow scroll 72 and through the hollow struts 74, into the center body 40. The surge bleed air 20 may exit the surge air duct 22 and enter the surge flow scroll 72, which may circumscribe the primary nozzle 30. The surge air duct 22 may be in fluid communication with the surge flow scroll 72. The hollow struts 74 may be in fluid communication with the surge flow scroll 72 and the center body 40. As described above, the surge bleed air 20 may exit through the center body 40 and the surge bleed air 20 may mix with the turbine exhaust flow 170, at or about the mixing plane 100.

Figure 12:
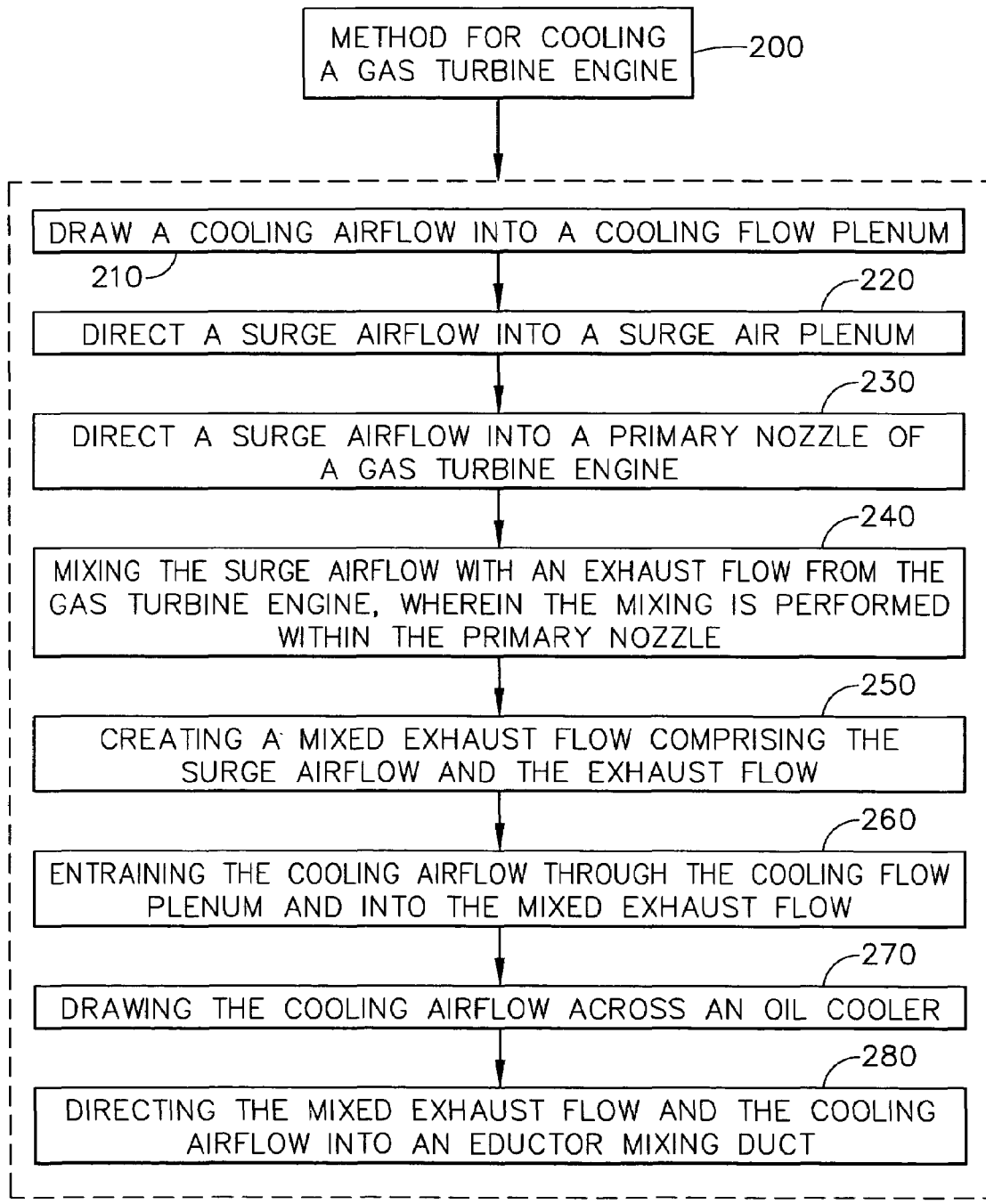
FIG. 12 schematically represents a series of steps involved in a method of cooling a gas turbine engine, according to a further embodiment of the present invention.

With reference to FIG. 12, a method for cooling a gas turbine engine, by directing airflow into a nozzle for entrainment with primary gas flow is described. Method 200 may comprise a step 210 of drawing cooling airflow 174 into a cooling flow plenum 80. Thereafter, step 220 may involve directing a surge bleed air 20 into a surge air plenum 70. Another step 230 may comprise directing the surge bleed air 20 into the primary nozzle 30 of a gas turbine engine, for example, an APU 18. A further step 240 may involve mixing the surge bleed air 20 with an exhaust flow 170 from the gas turbine engine, for example, the APU 18, wherein the mixing is performed within the primary nozzle 30. Thereafter, step 250 may comprise creating a mixed exhaust flow 172 comprising the surge bleed air 20 and the exhaust flow 170. Another step 260 may involve entraining the cooling airflow 174 through the cooling flow plenum 80 and into the mixed exhaust flow 172. Thereafter, step 270 may comprise drawing the cooling airflow 174 across an oil cooler 60; and step 280 may involve directing the mixed exhaust flow 172 and the cooling airflow 174 into an eductor mixing duct 90.

The cooling air 174 also may cool the APU compartment 14 air as it traverses the compartment 14 before or after the oil cooler 60 (depending on the FIG. 3A or the FIG. 10 arrangement). In the arrangement in FIG. 3A the compartment 14 cooling may raise the ambient air temperature about 10 to 30 degrees Fahrenheit before traversing the oil cooler 60. In the arrangement in FIG. 10 the oil cooler 60 receives ambient air temperature and may raise the temperature of the cooling air by about 60 to 70 degrees Fahrenheit before passing through the compartment 14 for cooling. In both cases the compartment 14 and oil may be maintained below required temperatures. In the arrangement in FIG. 10 an expensive cooling flow plenum 80 may be eliminated.

Continuing with FIG. 12, the oil cooler 60 may cool oil from the auxiliary power unit 18. The oil cooler 60 may also cool oil from an accessory driven by the auxiliary power unit 18, such as a generator, a gear box, or any other accessory. The surge bleed air plenum 70 may circumscribe the primary nozzle 30. The surge air plenum 70 may also be in fluid communication with a hollow strut 74 or a surge flow scroll 72.

It should be understood, of course, that the foregoing relates to exemplary embodiments of the invention and that modifications may be made without departing from the spirit and scope of the invention as set forth in the following claims.

We claim:

1. A cooling apparatus for a gas turbine engine, comprising:
   a primary nozzle;
   a cooling flow plenum in fluid communication with the external environment disposed adjacent to the primary nozzle and larger in radius than the primary nozzle; and
   a surge air dump nozzle disposed adjacent to the cooling flow plenum, wherein the primary nozzle, the cooling flow plenum, and the surge air dump nozzle are configured so as to direct surge bleed air into the primary nozzle.

2. The apparatus of claim 1, wherein the surge air dump nozzle includes mixing lobes.

3. The apparatus of claim 1, further comprising an oil cooler in fluid communication with the cooling flow plenum.

4. The apparatus of claim 1, wherein the primary nozzle is in fluid communication with a mixing duct.

5. The apparatus of claim 1, wherein the surge air dump nozzle circumscribes the primary nozzle.

6. The apparatus of claim 1, wherein the gas turbine engine is an auxiliary power unit of an aircraft.

7. The apparatus of claim 1, wherein cooling air is entrained with the surge bleed air.

8. An auxiliary power unit, comprising:
   an oil cooler;
   a primary nozzle disposed proximate to the oil cooler;
   a cooling flow plenum in air communication with the oil cooler and downstream of the oil cooler; and
   a surge air dump nozzle disposed adjacent to the primary nozzle, the surge air dump nozzle comprising mixing lobes; wherein the primary nozzle, the cooling flow plenum, and the surge air dump nozzle are configured so as to direct an exhaust flow and surge bleed air into the primary nozzle and mix the surge bleed air with the exhaust flow within the primary nozzle, and entrain the cooling air with the mixed surge bleed air and the exhaust flow.

9. The auxiliary power unit of claim 8, wherein the cooling flow plenum circumscribes the primary nozzle.

10. The auxiliary power unit of claim 8, wherein the surge air dump nozzle circumscribes the primary nozzle.

11. A cooling apparatus for an auxiliary power unit, comprising:
    an oil cooler;
    a primary nozzle disposed proximate the oil cooler;
    a cooling flow plenum in air communication with the oil cooler, the cooling flow plenum circumscribing the primary nozzle and disposed downstream of the oil cooler; and
    an annular surge air dump nozzle disposed about a center body and disposed within the cooling flow plenum, wherein the primary nozzle, the cooling flow plenum, and the surge air dump nozzle are formed so as to direct an exhaust flow and surge bleed air into the primary nozzle and mix the surge bleed air with the exhaust flow within the primary nozzle, and entrain the cooling air with the mixed surge bleed air and exhaust flow.

12. The apparatus of claim 11, wherein the oil cooler comprises an air to oil heat exchanger.

13. The apparatus of claim 11, wherein the primary nozzle is in fluid communication with a mixing duct.

14. A cooling apparatus, comprising:
    an oil cooler;
    a center body;
    a primary nozzle disposed proximate the oil cooler and at least partially surrounding at least a portion of the center body;
    a surge air plenum disposed about the primary nozzle; and
    a hollow strut in fluid communication with the center body and the surge air plenum such that surge bleed air is directed to flow through the surge air plenum, the hollow strut, and the center body and mixes with an exhaust flow.

15. The apparatus of claim 14, further comprising an annular surge flow scroll, wherein the hollow strut is in fluid communication with the annular surge flow scroll such that the surge bleed air is directed to flow through the annular surge flow scroll.

16. The apparatus of claim 15, further comprising an annular surge dump nozzle, wherein the hollow strut is in fluid communication with the annular surge dump nozzle such that the surge bleed air is directed to flow through the annular surge dump nozzle.

17. The apparatus of claim 16, wherein the surge air dump nozzle comprises mixing lobes, and wherein the hollow strut is in fluid communication with the mixing lobes such that the surge bleed air is directed to flow through the mixing lobes.

18. The apparatus of claim 14, wherein the surge air plenum circumscribes the primary nozzle.

19. The apparatus of claim 14, wherein the primary nozzle is in fluid communication with a mixing duct.

20. An aircraft, comprising:
   a compartment;
   an auxiliary power unit housed within the compartment;
   the auxiliary power unit comprising a turbine;
   an oil cooler within the compartment;
   a primary nozzle downstream of the turbine;
   a cooling flow plenum in air communication with the oil cooler and the cooling flow plenum disposed downstream of the oil cooler;
   a surge air plenum in air communication with a surge air duct;
   a surge air dump nozzle disposed about the primary nozzle and downstream of the surge air plenum; and
   a mixing duct, wherein the primary nozzle, the cooling flow plenum, and the surge air plenum are formed so as to direct an exhaust flow from the auxiliary power unit and surge bleed air into the primary nozzle and mix the surge bleed air with the exhaust flow, within the primary nozzle, and entrain the cooling air with the mixed surge bleed air and exhaust flow.

21. The cooling system of claim 20, wherein the surge air dump nozzle comprises mixing lobes.

22. The cooling system of claim 20, wherein the surge air dump nozzle is an annular surge dump nozzle.

23. The cooling system of claim 20, wherein the surge air duct is in fluid communication with a hollow strut.

24. The cooling system of claim 20, wherein the surge air duct is in fluid communication with a surge flow scroll.

25. The cooling system of claim 20, further comprising a compartment inlet for allowing ambient air to be drawn through the compartment.

26. The cooling system of claim 20, wherein the oil cooler comprises an air to oil heat exchanger.

27. The cooling system of claim 20, wherein the compartment is located within a tail cone of the aircraft.

28. A method for cooling a gas turbine engine, comprising:
   directing a cooling airflow into a cooling flow plenum;
   drawing a surge bleed air into a surge air plenum; directing the surge bleed air into a primary nozzle of the gas turbine engine;
   mixing the surge bleed air with an exhaust flow from the gas turbine engine, wherein the mixing is performed within the primary nozzle;
   creating a mixed exhaust flow comprising the surge bleed air and the exhaust flow;
   entraining the cooling airflow through the cooling flow plenum and into the mixed exhaust flow;
   drawing the cooling airflow across an oil cooler; and
   directing the mixed exhaust flow and the cooling airflow into an eductor mixing duct.

29. The method of claim 28 wherein the oil cooler cools oil from the gas turbine engine.

30. The method of claim 28 wherein the oil cooler cools oil from an accessory driven by the gas turbine engine.

31. The method of claim 28, wherein the surge air plenum circumscribes the primary nozzle.

32. The method of claim 28, wherein the surge air plenum is in fluid communication with a hollow strut.

* * * * *